(12) United States Patent
Covic et al.

(10) Patent No.: US 9,899,145 B2
(45) Date of Patent: Feb. 20, 2018

(54) WINDING ARRANGEMENTS IN WIRELESS POWER TRANSFER SYSTEMS

(71) Applicant: Auckland UniServices Ltd., Auckland (NZ)

(72) Inventors: Grant Anthony Covic, Mount Albert (NZ); John Talbot Boys, Albany (NZ); Nicholas Athol Keeling, Glenfield (NZ); Edward van Boheemen, Panmure (NZ); Michael Le Gallais Kissin, Takapuna (NZ); Jonathan Beaver, Mount Wellington (NZ); Mickel Bipin Budhia, Green Bay (NZ); Chang-Yu Huang, Takapuna (NZ)

(73) Assignee: Auckland UniServices Ltd., Auckland (NZ)

( * ) Notice: Subject to any disclaimer, the term of this patent is extended or adjusted under 35 U.S.C. 154(b) by 498 days.

(21) Appl. No.: 14/386,311

(22) PCT Filed: Mar. 20, 2013

(86) PCT No.: PCT/NZ2013/000046
§ 371 (c)(1),
(2) Date: Sep. 18, 2014

(87) PCT Pub. No.: WO2013/141718
PCT Pub. Date: Sep. 26, 2013

(65) Prior Publication Data
US 2015/0054350 A1 Feb. 26, 2015

Related U.S. Application Data

(60) Provisional application No. 61/613,420, filed on Mar. 20, 2012.

(51) Int. Cl.
*H01F 38/14* (2006.01)
*H01F 37/00* (2006.01)
(Continued)

(52) U.S. Cl.
CPC .......... *H01F 38/14* (2013.01); *B60L 11/182* (2013.01); *H01F 27/2823* (2013.01);
(Continued)

(58) Field of Classification Search
CPC .. H01F 38/14; H01F 27/2823; H01F 27/2871; H01F 41/06; B60L 11/182;
(Continued)

(56) References Cited

U.S. PATENT DOCUMENTS

| 2009/0230777 A1 | 9/2009 | Baarman et al. |
| 2012/0146580 A1 | 6/2012 | Kitamura |

FOREIGN PATENT DOCUMENTS

| EP | 0469762 | 2/1992 |
| JP | 1195922 | 4/1999 |

(Continued)

OTHER PUBLICATIONS

"International Application No. PCT/NZ2013/000046, International Search Report and Written Opinion dated Jun. 28, 2013", (Jun. 28, 2013), 13 pgs.

*Primary Examiner* — Hal Kaplan
(74) *Attorney, Agent, or Firm* — Schwegman Lundberg & Woessner, P.A.

(57) ABSTRACT

Systems, methods and apparatus for wireless power transfer and particularly wireless power transfer to remote systems such as electric vehicles are disclosed. In one aspect an induction coil is provided comprising a plurality of substantially co-planar coils formed from one or more lengths of conducting material, each length of conducting material being electrically connectable at each end to a power source or battery, and wherein at least one of the lengths of conducting material is continuously wound around two or more of the coils. In another aspect, a method is provided for forming such an induction coil. In yet another aspect, a switching device is operable to alter the configuration of the coils, for example in response to a detected characteristic of another induction coil or device coupled thereto.

20 Claims, 9 Drawing Sheets (51) Int. Cl.
*H01F 41/06* (2016.01)
*H02J 5/00* (2016.01)
*H02J 7/02* (2016.01)
*H01F 27/28* (2006.01)
*B60L 11/18* (2006.01)

(52) U.S. Cl.
CPC ......... *H01F 27/2871* (2013.01); *H01F 41/06* (2013.01); *H02J 5/005* (2013.01); *H02J 7/025* (2013.01); *B60L 2210/20* (2013.01); *B60L 2210/30* (2013.01); *B60L 2210/40* (2013.01); *Y02T 90/168* (2013.01); *Y04S 30/12* (2013.01); *Y10T 29/49071* (2015.01)

(58) Field of Classification Search
CPC ............. B60L 2210/20; B60L 2210/30; B60L 2210/40; H02J 5/005; H02J 7/025; Y10T 29/49071; Y02T 90/168; Y04S 30/12
USPC ....................................................... 307/104
See application file for complete search history.

(56) References Cited

FOREIGN PATENT DOCUMENTS

| | | |
|---|---|---|
| JP | 11186086 | 7/1999 |
| JP | 11187583 | 7/1999 |
| JP | 2011517926 | 6/2011 |
| WO | WO-2008/140333 | 11/2008 |
| WO | WO-2009/114671 | 9/2009 |
| WO | WO-2011/016736 A2 | 2/2011 |
| WO | WO-2011036863 | 3/2011 |
| WO | WO-2011/138507 | 11/2011 |
| WO | WO-2013/141718 | 9/2013 |

WINDING ARRANGEMENTS IN WIRELESS POWER TRANSFER SYSTEMS

PRIORITY CLAIM TO RELATED APPLICATIONS

This application is a U.S. national stage application filed under 35 U.S.C. § 371 from International Application Serial No. PCT/NZ2013/000046, which was filed Mar. 20, 2013, and published as WO 2013/141718 on Sep. 26, 2013, and which claims priority to U.S. Application No. 61/613,420, filed Mar. 20, 2012, which applications and publication are incorporated by reference as if reproduced herein and made a part hereof in their entirety, and the benefit of priority of each of which is claimed herein.

FIELD OF THE INVENTION

The technical field relates generally to wireless power transfer, and more specifically to devices, systems, and methods related to wireless power transfer to remote systems such as vehicles including batteries. More particularly, the present disclosure relates to winding arrangements for induction coils used in wireless power transfer systems, and in particular inductive power transfer (IPT) systems.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are desirable.

One system of wireless power transfer is inductive power transfer (IPT). In IPT, power is transferred from a primary power device to a secondary (or "pick-up") power device. Typically, each device includes one or more windings of electric current conveying media, such as wires, so are commonly referred to as coils.

WO 2008/140333 discloses an IPT system in which the primary and secondary devices comprise a single coil that is circular or oval in shape. Disadvantages of this arrangement include the leakage of flux from the coils and therefore poor power transfer efficiency, even where shielding is used, and a lack of tolerance away from the optimal alignment between the primary and secondary coils before a large reduction in power transfer between the coils is observed. The maneuverability of an electric vehicle may limit the ease of achieving a high degree of alignment between a pick-up coil and a primary coil, so greater tolerance is desired.

WO 2011/016736 discloses an IPT system for powering electric vehicles in which a base (usually the primary) coil, typically positioned on the ground, consists of two separate co-planar coils positioned above a core formed from a material of high magnetic permeability, such as ferrite. In this arrangement, there is no straight path through the core that passes through the coils. As such, the coils act as pole areas and lines of magnetic flux arc between them in the form of a "flux pipe" above the coils, a zone of high flux concentration. Advantageously, the arrangement results in little leakage of flux below the coils on the side of the core. However, one problem with the use of two separate coils is that the inductance of each coil can change relative to the other with different positions of the pick-up coil. When the two base coils are driven in parallel, this can result in an uneven current distribution which adversely affects the power delivery profile and magnetic field. Inefficiencies may also arise because of an increased mistuning of the system and the mutual inductance between the two base coils.

In general with IPT systems, it is desirable for the primary coil to have a low inductance. A coil with a high inductance is difficult to drive at high frequencies because large voltages are required across the coil terminals. In addition, it is difficult to form an induction coil with a low inductance that has sufficiently large physical area to be capable of charging an electric vehicle while at the same time keeping the induction coil physically thin. A physically thin coil is unobtrusive and is advantageous in wireless power transfer systems for electric vehicles where base or primary coils are positioned at ground level and the vehicle is charged by positioning a pick-up induction coil over the base coil. This is because some base coils could be positioned on top of the ground surface whereas others could be embedded in it. The thinner the base coil, the smaller the relative difference in the gap between the base and pick-up coils in these two situations. The base coil inductance may be tuned to an expected coil separation distance for optimal charging. As a result, a thin base coil means greater tolerance to different installations of a base coil relative to the ground.

Typical base coils are designed with a specific inductance and to work at a specified frequency and coil current to ensure optimal charging of batteries connected to pick-up coils designed with complimentary characteristics. Attempting to charge pick-up coils that are sub-optimally compatible with the base coil can lead to slow charging times, energy waste or overheating components. However, different types or models of vehicles may have different pick-up coils or batteries. It is therefore desirable for base chargers in a wireless charging system to be able to charge vehicles of differing characteristics with minimal loss of efficiency.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus for transmitting or receiving wireless power. The apparatus may comprise a plurality of substantially co-planar coils. The plurality of coils may be formed from one or more lengths of conducting material, each length of conducting material being electrically connectable at each end to a power source or battery, and wherein two or more of the coils may comprise the same at least one of the lengths of conducting material.

In a related aspect, the disclosure provides a method of forming an apparatus for transmitting or receiving wireless power. The method may comprise winding one or more lengths of conducting material in a continuous path to form a plurality of substantially co-planar coils with at least one of the one or more lengths of conducting material being continuously wound around two or more of the coils.

Another aspect of the disclosure provides a method of operating a first induction coil in a wireless power transfer system. The method may comprise receiving a signal from a second induction coil with which the first induction coil is to transfer power, the signal comprising characteristics of the second induction coil or a device to which the second induction coil is attached. The method may further comprise selecting a configuration of the first induction coil based on the characteristics of the second induction coil and a desired power transfer between the first and second induction coils. The method may also comprise altering the configuration of the first induction coil accordingly.

Further aspects of the invention, which should be considered in all its novel aspects, will become apparent from the following description.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over any other embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a receiving power transfer structure, such as an "antenna" or "coil" to achieve power transfer. The term "coils" is intended to refer to a component that may wirelessly output or receive energy for coupling to another "coil." The coil may also be referred to as an "antenna" of a type that is configured to wirelessly output or receive power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

The term "coil" may be used in both the sense of meaning any winding arrangement of electrically conducting material and in the sense of a localised winding arrangement having a number of turns of conducting material that all go around a single central point. A "coil" as described herein may comprise a single coil or a number of "coils."

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
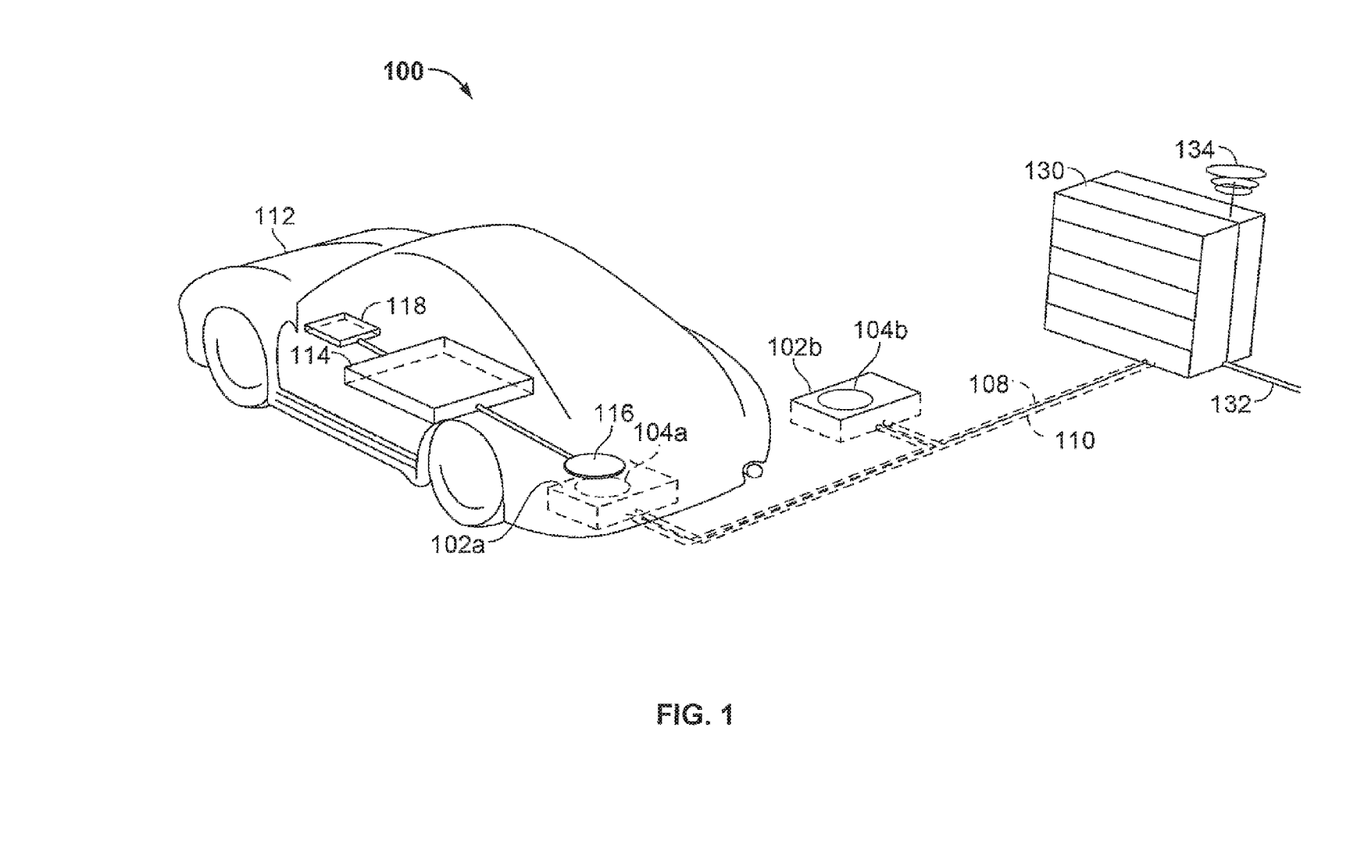
FIG. 1 is a diagram of an exemplary wireless power transfer system for charging an electric vehicle, in accordance with an exemplary embodiment of the invention.

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging systems 102a and 102b, each with a respective base system induction coil 104a and 104b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about ½π of the wavelength of the base system induction coil 104a (and vice versa for the electric vehicle induction coil 116) as will be further described below.

Local distribution 130 may be configured to communicate with external sources (e.g., a power grid) via a communication backhaul 134, and with the base wireless charging system 102a via a communication link 108.

The base wireless charging system 102a may be located in a variety of locations. As non-limiting examples, some suitable locations include a parking area at a home of the electric vehicle 112 owner, parking areas reserved for electric vehicle wireless charging modeled after petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors can be avoided, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
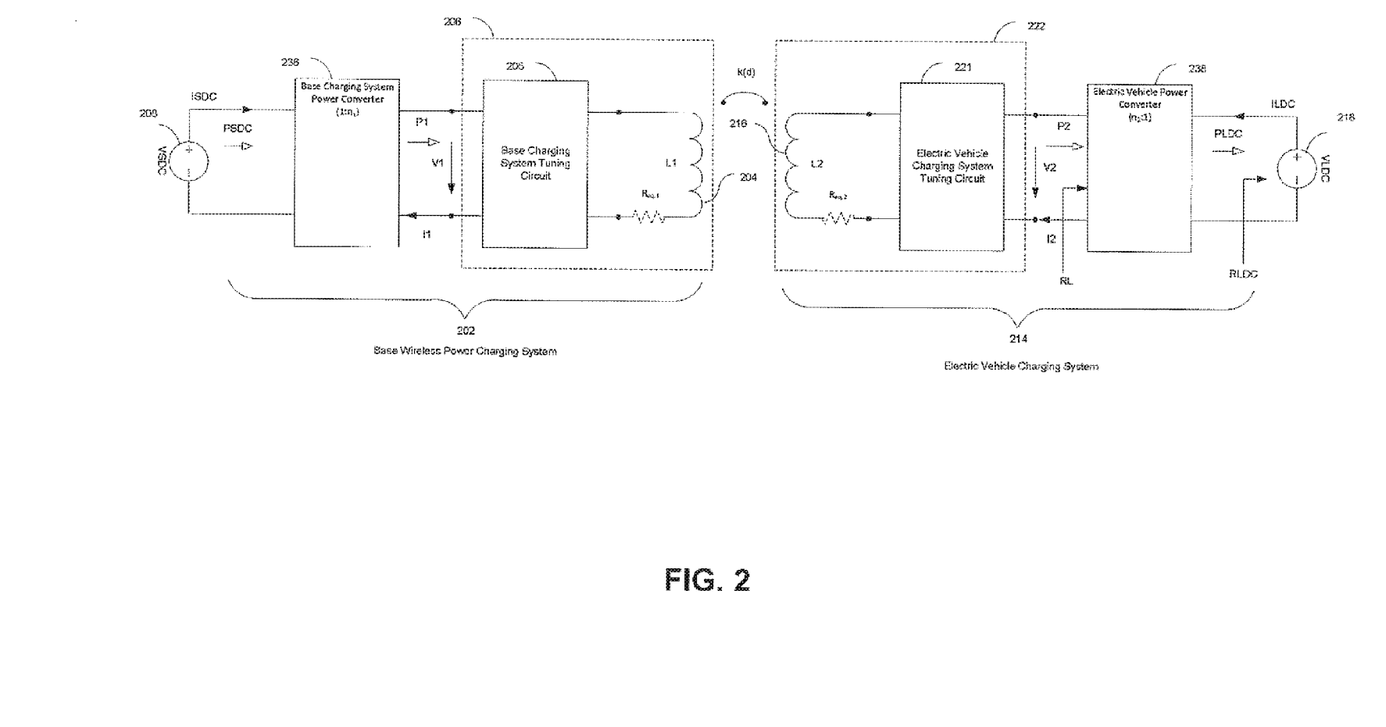
FIG. 2 is a schematic diagram of exemplary core components of the wireless power transfer system of FIG. 1.

FIG. 2 is a schematic diagram of exemplary key components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non limiting example, as shown in FIG. 2, a capacitor may be added in series with the induction coil to create a resonant circuit (e.g., the base system transmit circuit 206) that generates an electromagnetic field, which may be referred to as a series-tuned resonant circuit. Accordingly, for larger diameter induction coils, the value of capacitance for inducing resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit, alternatively referred to as a parallel-tuned resonant circuit). Furthermore an induction coil may be designed to have a high quality (Q) factor to improve the resonance of the induction coil.

The coils may be used for the electric vehicle induction coil 216 and the base system induction coil 204. Using resonant structures for coupling energy may be referred to as "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including a base charging system tuning circuit 205 which may consist of reactive tuning components in a series or parallel configuration or a combination of both with the base system induction coil 204 to emit an electromagnetic field at a desired frequency. In one embodiment, a capacitor may be provided to form a resonant circuit with the base system induction coil 204 that resonates at a desired frequency.

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 216. In this case, the base system induction coil 204 and electric vehicle induction coil 216 may become coupled to one another such that power may be transferred to the electric vehicle receive circuit 222 including an electric vehicle charging system tuning circuit 221 and electric vehicle induction coil 216. The electric vehicle charging system tuning circuit 221 may be provided to form a resonant circuit with the electric vehicle induction coil 216 that resonates at a desired frequency. The mutual coupling coefficient resulting at coil separation is represented in the diagram by k(d). Equivalent resistances $R_{eq,1}$ and $R_{eq,2}$ represent the losses that may be inherent to the induction coils 204 and 216 and any anti-reactance capacitors that may, in some embodiments, be provided in the base charging system tuning circuit 205 and electric vehicle charging system tuning circuit 221 respectively. The electric vehicle receive circuit 222 including the electric vehicle induction coil 216 and electric vehicle charging system tuning circuit 221 receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to decouple the electric vehicle charging system 214 (acting as the receiver) from the base wireless charging system 202. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 216 and the resonant frequency of the base system induction coil 204 are very close or substantially the same. Transmission losses between the base wireless power charging system 202 and electric vehicle charging system 214 can be reduced when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy for coupling to another "coil." The coil may also be referred to as an "antenna" of a type that is configured to wirelessly output or receive power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned along an X direction and a Y direction to enable an electric vehicle induction coil 116 within the electric vehicle 112 to be adequately aligned with a base wireless charging system 102a within an associated parking area.

As discussed above, the electric vehicle charging system 114 may be placed on the underside of the electric vehicle 112 for transmitting and receiving power from a base wireless charging system 102a. For example, an electric vehicle induction coil 116 may be integrated into the vehicle's underbody near a center position providing maximum safety distance in regards to EM exposure and permitting forward and reverse parking of the electric vehicle.

Figure 3:
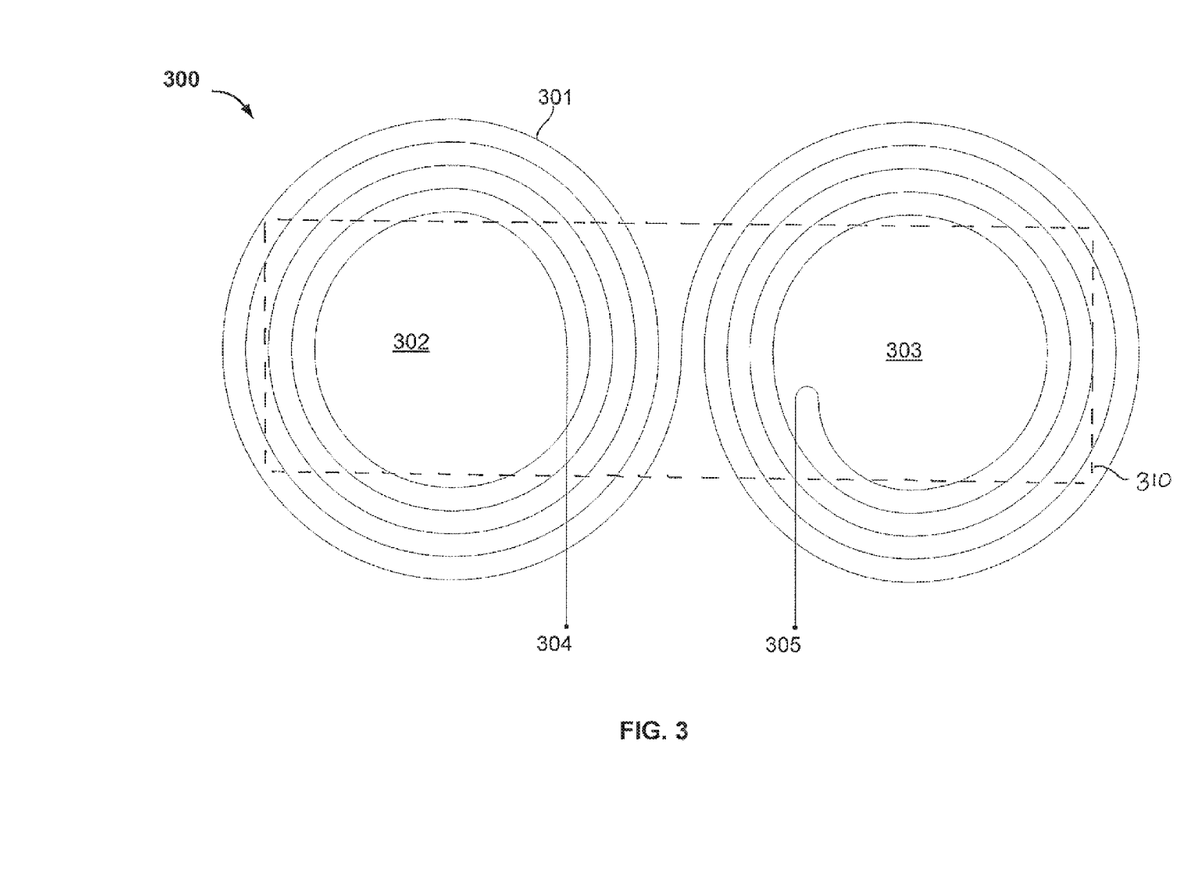
FIG. 3 is a diagram of a winding arrangement of a length of conducting material used in an induction coil according to one embodiment of the invention.

According to some embodiments of the invention, an induction coil comprises lengths of conducting material wound in a plurality of individual coils. For example, FIG. 3 is a diagram of a winding arrangement 300 of a length of conducting material 301 which is used in an induction coil according to one embodiment of the invention. Conducting material 301 may be any suitable material formed of electrically conducting media and may include wires and the like. In one embodiment, conducting material 301 comprises litz wire because of its advantageous properties of reducing the skin effect and the proximity effect when carrying alternating currents. A "length of conducting material" may be formed from one or more smaller lengths connected together in a way whereby the longer length acts like a single length of conducting material. For example, lengths of wire may be wound, tied, plugged, fused, soldered or the like together to form a longer length of wire.

In winding arrangement 300, length of conducting material 301 is wound into an arrangement comprising two substantially co-planar coils 302 and 303 positioned generally adjacent one another. The length of conducting material 301 is wound in a spiral arrangement, that is, an arrangement such that each coil 302 and 303 is formed from a spiral of loops of increasing radius where the length of conducting material does not cross over itself within each coil. The ends of conducting material 301 form terminals 304 and 305 that, in use, are electrically connected to a power source or battery in a wireless power transfer system.

Coils 302 and 303 are wound in opposition such that one is wound clockwise and the other is wound counter-clockwise. In this way, coils 302 and 303 are wound such that electric current passing through the lengths of conducting material flows in the same direction in adjacent portions of the two coils. Furthermore, when used in an induction coil, the two coils 302 and 303 may be positioned in magnetic association with one or more magnetically permeable members 310. For example, the coils may be positioned on top of a core formed of a number of parallel ferrite bars. As a result, when alternating current is passed through the induction coil, the coils 302 and 303 act as pole areas and lines of magnetic flux arc between them in the form of a "flux pipe" above the coils, a zone of high flux concentration. A pick-up coil can be positioned within the flux pipe to achieve wireless, or more specifically inductive, power transfer. Advantageously, the arrangement results in little leakage of flux below the coils on the side of the core.

The two coils 302 and 303 are formed from the same length of conducting material wound continuously around the coils. The embodiments shown in FIGS. 3-5 and described below provide various arrangements by which a single length of conducting material can be wound into two coils in which the two coils are wound in opposition and the length of conducting material does not cross over itself within each coil. The arrangements of FIGS. 3-5 differ as to how each end of the length of conducting material is formed, or is immediately connected to, the innermost or outermost winding of each coil.

In winding arrangement 300 of FIG. 3, one end of the length of conducting material forms the innermost winding of coil 302 and the other end forms the innermost winding of coil 303. In winding arrangement 400 of FIG. 4, one end of the length of conducting material forms the innermost winding of coil 402 and the other end forms the outermost winding of coil 403. In winding arrangement 500 of FIG. 5, one end of the length of conducting material forms the outermost winding of coil 502 and the other end forms the outermost winding of coil 503.

Figure 4:
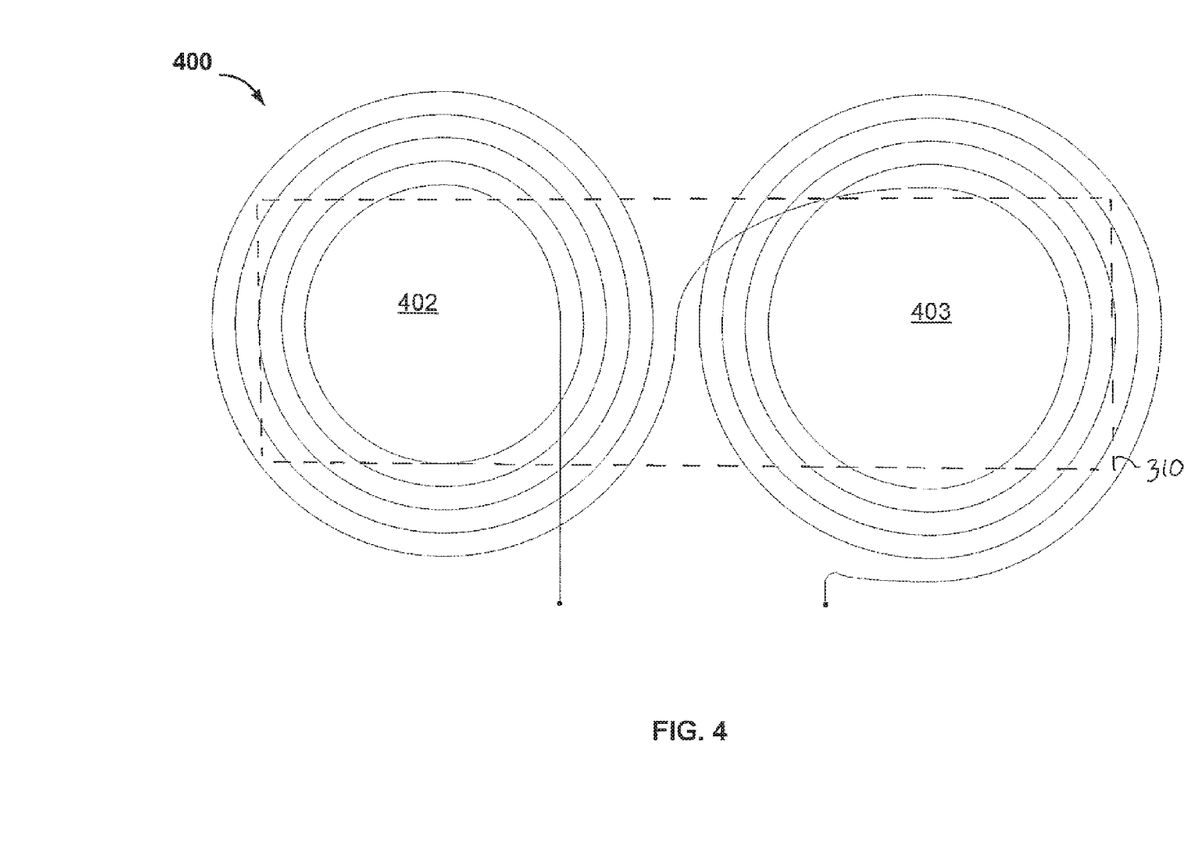
FIG. 4 is a diagram of a winding arrangement of a length of conducting material used in an induction coil according to another embodiment of the invention.
Figure 5:
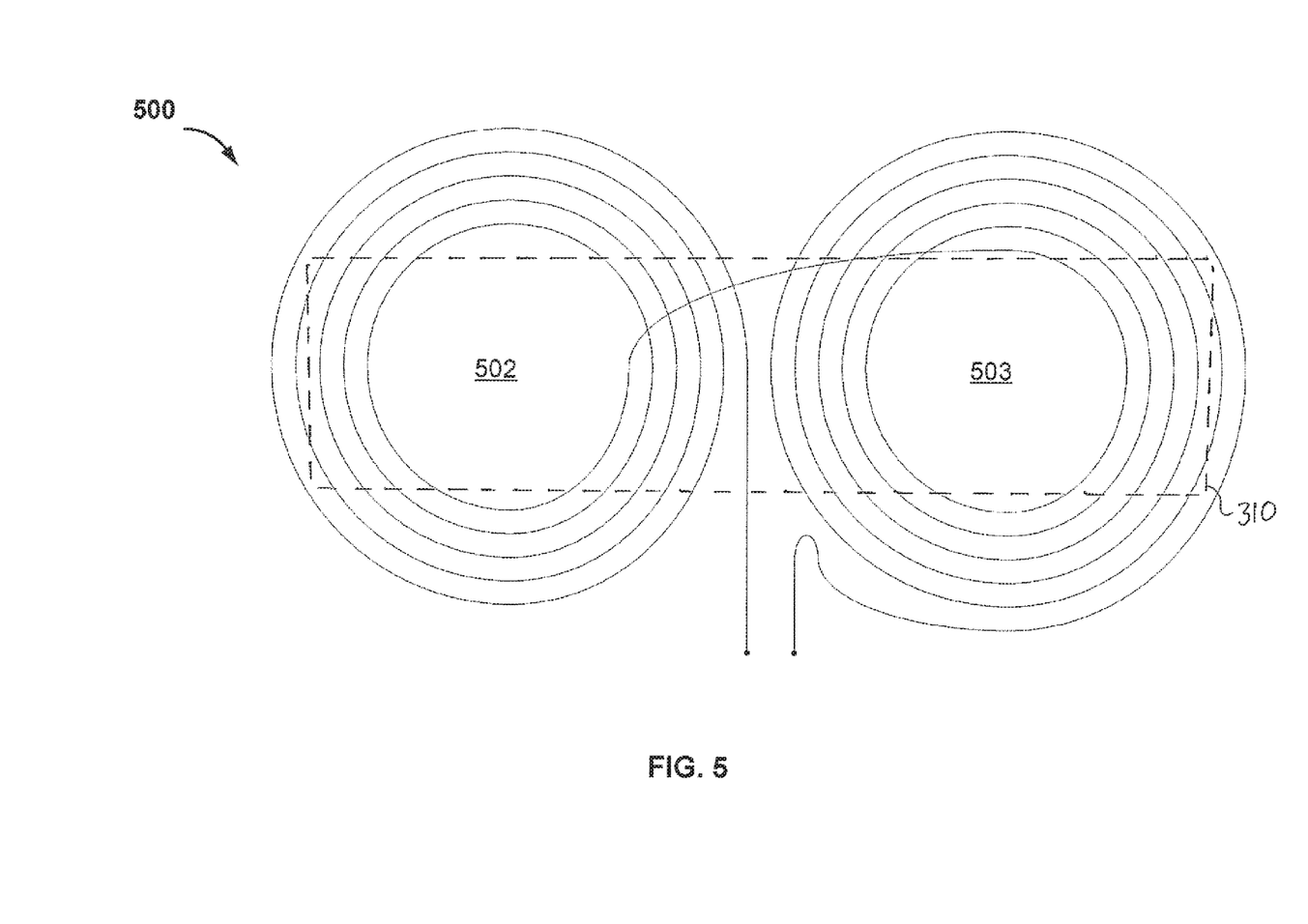
FIG. 5 is a diagram of a winding arrangement of a length of conducting material used in an induction coil according to still another embodiment of the invention.

While all of the aforementioned winding arrangements are covered by different embodiments of the invention, there are differences between the three arrangements that may affect the choice of which arrangement is used for different wireless power transfer situations.

In winding arrangement 400, both coils can be formed by winding the length of conducting material in a continuous path from the innermost winding to the outermost winding. In contrast, each of winding arrangements 300 and 500 has one coil that is formed by winding the length of conducting material from the outside to the inside. This makes winding arrangement 400 the easiest to produce when manually laying out the conducting material because the material can be wound around an object positioned centrally inside each coil and each loop of material can be placed immediately outside the previous loop. When winding from the outside to the inside, it is more difficult to manually lay the material down in the desired coil arrangement.

Winding arrangement 300 has the least voltage difference between the portions of the length of conducting material in coil 302 and coil 303 that are adjacent to each other. This is because the outermost winding of coil 302 is immediately connected to the outermost winding of coil 303. In contrast, winding arrangements 400 and 500 have a larger voltage difference between lengths of conducting material between the two coils that are adjacent to each other or actually cross over each other. Where there is a significant voltage difference, there is a risk of discharge between adjacent or crossing wires, which can cause the system to malfunction or sparks which could cause a fire. To lessen this risk, additional insulation is required, which increases the complexity and/or costs of manufacturing the induction coil and adds additional components.

Other considerations to take into account when comparing the three winding arrangements disclosed in FIGS. 3 to 5 are: the routing of the wires between the coils and the entry and exit points; threading wire over or under itself at crossing points; and pre-cutting the wire to certain lengths. These considerations may further add to the complexity of manufacture.

It will be understood that the differences and considerations described above may have differing degrees of importance for induction coils used in different scenarios and manufactured in different ways. For example, the considerations that are important when an induction coil is manually assembled may not be as critical in a mass production environment. The invention is not limited to any one of the arrangements discussed above.

In some embodiments, for an automated or semi-automated manufacturing environment, for example, the coil arrangement shown in FIG. 3 may be used. In this arrangement, the wire does not cross over itself between the coils and the minimal voltage difference between adjacent lengths of wire negates the need for additional insulation. The difficulties of manually winding a coil of wire from the outside to the center may be lessened when automation is used. The coil arrangement shown in FIG. 4 may be considered to be suited for manual production because both coils are wound from the center to the outside. FIG. 5 includes a configuration which may be considered less suited than the configurations of FIGS. 3 and 4 for the above described corresponding environments.

The embodiments of the invention described in relation to FIGS. 3 to 5 are directed to an induction coil comprising a single length of conducting material such as wire wound into two coils. In other embodiments, other numbers of coils of conducting material may comprise the whole induction coil. For example, an induction coil may comprise an array of four coils arranged in a square-like pattern. In one embodiment, a single length of wire may be wound continuously to form all four of the coils. However, two lengths of wire may be wound continuously to form two coils each. The coils may be arranged so that the current flows in the same direction around the coils diagonally opposite each other and in the opposite direction to the adjacent coils.

More generally, the embodiments of FIGS. 6-9 relate to induction coils comprising a plurality of coils formed from a continuous winding of a single length of conducting material or a number of lengths of conducting material where at least one of the lengths of conducting material forms at least two coils.

Figure 6:
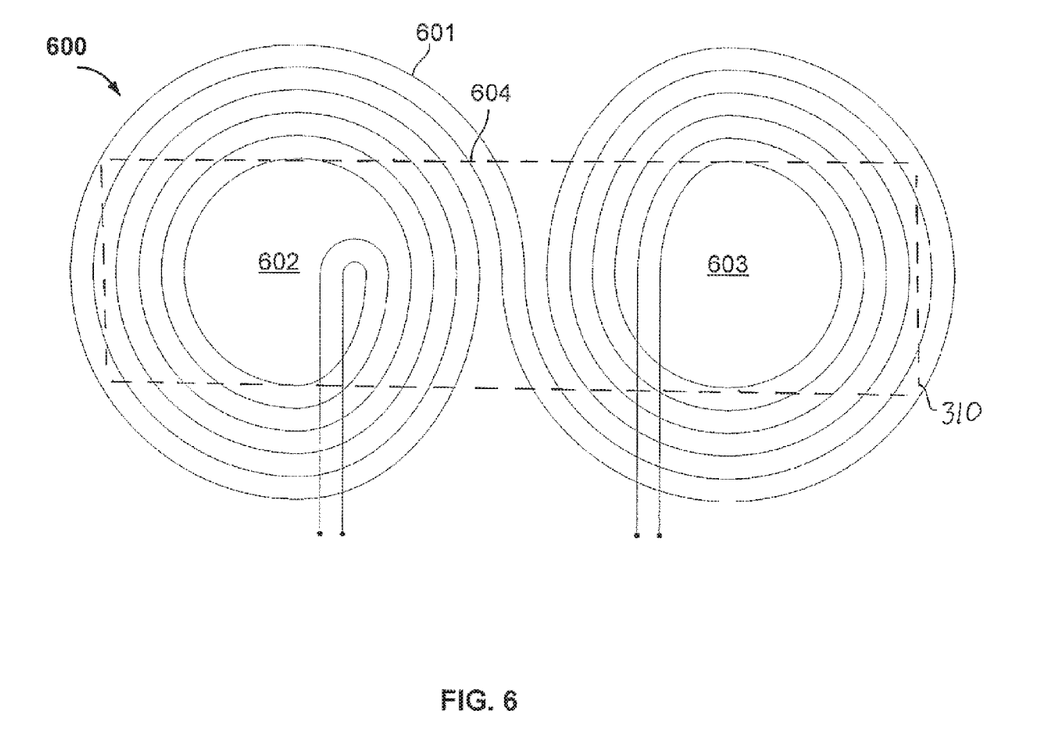
FIG. 6 is a diagram of a winding arrangement of two lengths of wire according to a further embodiment of the invention.

In other embodiments of the invention, two or more of lengths of conducting wire are arranged in parallel alignment around the plurality of coils. One example is shown in FIG. 6, which is a diagram of a winding arrangement 600 of two lengths of litz wire 601 and 604 according to one embodiment of the invention. Each length of litz wire 601 and 604 is continuously wound around to form two coils 602 and 603 with each end of both wires being electrically connectable to a power source or battery.

Figure 7:
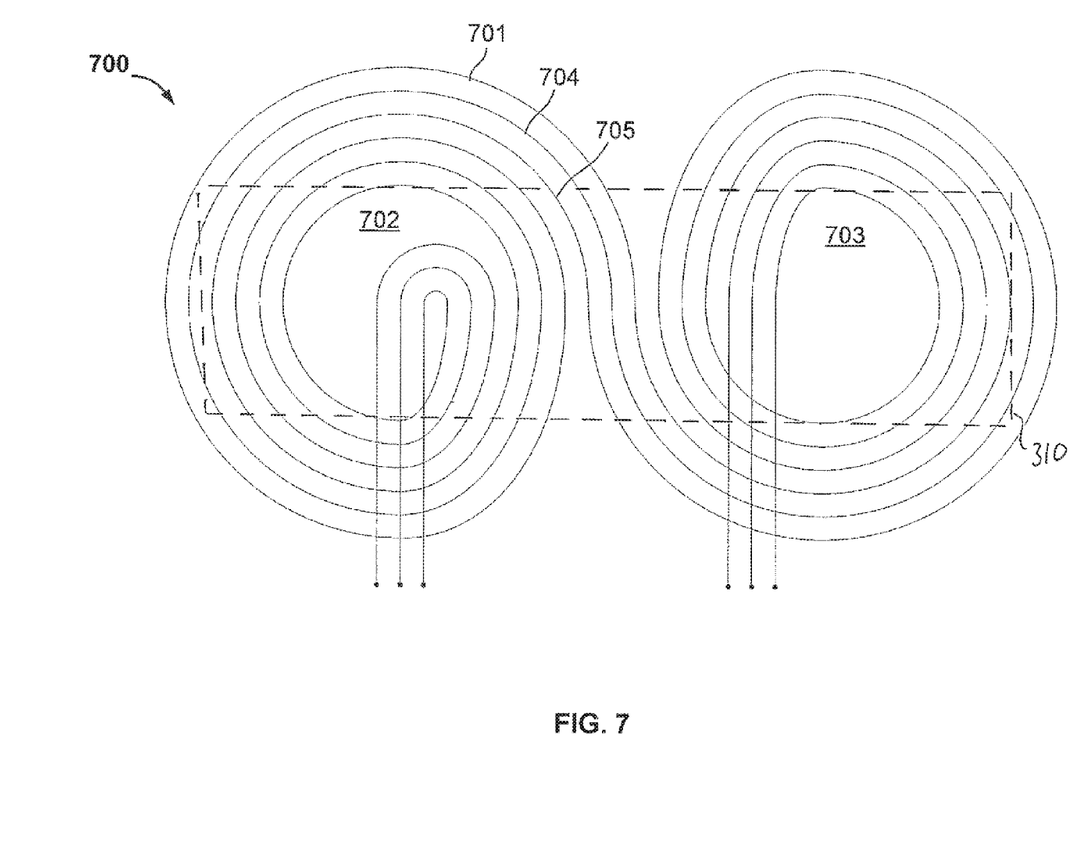
FIG. 7 is a diagram of a winding arrangement of three lengths of wire according to a further embodiment of the invention.

A further embodiment of the invention is shown in FIG. 7, in which there is provided a winding arrangement 700 in which three lengths of litz wire 701, 704 and 705 are arranged in parallel alignment to form two coils 702 and 703. Other embodiments are envisaged which comprise other numbers of lengths of conducting material arranged in parallel alignment to from any number of coils.

The litz wires of the embodiments shown in FIGS. 6 and 7 may be connected to a power source or battery in parallel. The more wires an induction coil has connected in parallel, the lower its inductance, all else being equal. As such, selecting the number of wires arranged in the coils of an induction coil can be used as a way of tailoring the inductance of the coil to the requirements of the situation in which it is to be used. Different vehicles to be charged may work optimally with base induction coils of differing inductances. Selecting the inductance of the coil is also desirable depending on the physical positioning of the base coil with respect to the pick-up coil. A greater or lesser physical separation between the two coils may warrant a greater or lesser inductance in the base coil for optimum coupling.

For example, it may be desirable for some base coils to be embedded in a ground surface and not lie on top of it for some reason (for example, if a base coil sticking up from the ground would be a hazard). In this case, the distance between the base coil and the pick-up coil in a given vehicle would differ from other base coils which may be desirably situated on top of the ground (for example, if digging into the ground surface is difficult or not permitted). Being able to vary the inductance of base coils according to the situation they will be used in may be advantageous.

It will be noted that the lengths of litz wire in the embodiments shown in FIGS. 6 and 7 all have the same length irrespective of how many wires are arranged in parallel alignment. Because of the way the individual coils are wound in opposition to each other such that a flux pipe is created when current passes through the coils, the outermost wire in one coil is the innermost wire in the other coil, and vice versa. This means that the voltage across all of the wires is substantially the same and the self inductance of each wire is also substantially the same. In turn, this means there is an even current distribution around the coils. A consequence of this property is that lengths of wire arranged and connected in parallel according to embodiments of the invention are able to provide advantages over prior art arrangements such as single or double coils in which separate lengths of wire comprise each coil. In these arrangements, wires arranged and connected in parallel would result in each wire having a different path length and therefore a different inductance. As a result, a poorer coupling would be achieved when compared to what is obtainable using the embodiments of the invention.

A further advantage of the embodiments of the invention discussed in relation to FIGS. 6 and 7 is that the induction coil can be constructed to be physically thinner than a circular coil of equivalent inductance. This is because the wires are arranged next to each other in the embodiments of the invention described. In a circular coil a thicker wire would be required to reduce the inductance of the coil, all else being equal (since the use of parallel wires in a circular coil has the disadvantages discussed above). A physically thin coil is an advantage because the thinner the induction coil, the smaller the relative difference in distance between the base coil and the pick-up coil when comparing an induction coil placed on top of the ground to one embedded in the ground. This smaller relative difference in distance translates into a smaller difference in the coupling factor. Therefore a base coil according to the invention is more flexible to being suitable for installation in differing locations or positions.

Figure 8:
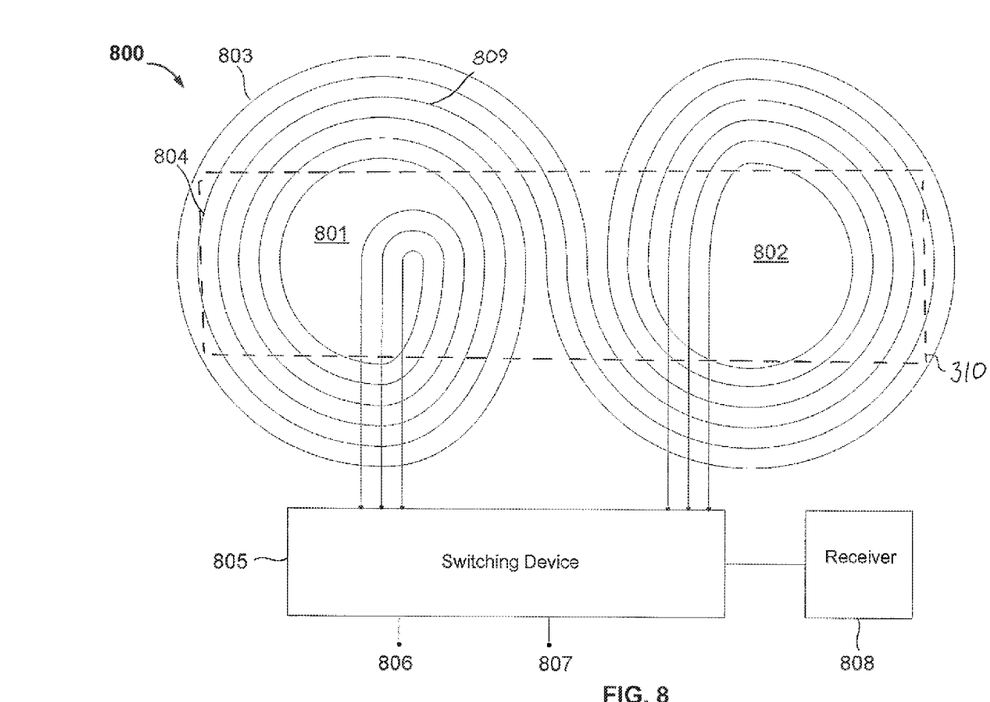
FIG. 8 is a diagram of exemplary components of an induction coil according to one embodiment of the invention.

In certain embodiments of the invention, the induction coil comprises switching means comprising one or more switches operable to connect the lengths of conducting material comprising the coils in different ways. An exemplary embodiment is illustrated in FIG. 8, which is a diagram of an induction coil 800 according to one embodiment of the invention. Induction coil 800 comprises two coils 801 and 802 formed from continuous windings of two lengths of litz wire 803 and 804 in parallel alignment with each other. A third wire 809 may also be provided. The lengths of litz wire are electrically connected to a switching device 805, which is itself connected in use to a power source or a battery via terminals 806 and 807 in a wireless power transfer system.

Considering wires 803 and 804 in use, switching device 805 is operable to selectively connect wires 803 and 804 to terminals 806 and 807. In the embodiment shown in FIG. 8, the following connection combinations are possible for wires 803 and 804:

A) Just wire 803 is connected between the terminals;

B) Just wire 804 is connected between the terminals;

C) Both wires are connected in parallel between the terminals;

D) Both wires are connected in series between the terminals; and

E) Neither wire is connected to the terminals.

Each of the different arrangements A)-E) above results in induction coil 800 having a different inductance. As such, switching device 805 operates to selectively change the inductance of induction coil 800 to suit the requirements of a given charging situation, for example to ensure optimal charging of a pick-up coil.

In other embodiments, a switching device may be operable to switch the connection between any numbers of wires arranged in an induction coil. The more wires there are in each coil, the greater the range of inductance values there are available using different connection arrangements of the wires. More available inductance values mean a greater flexibility of the induction coil to adapt to different charging requirements.

Switching device 805 may comprise any combination of switches capable of connecting the wires of the induction coil to the terminals in the desired configurations. The switching device may comprise a processor that controls operation of the switches in use.

Optionally, the induction coil may comprise a receiver 808 adapted to receive a signal and connected to the switching device such that the switching device may operate in response to the received signal. The signal may be sent from a device to be charged, such as an electric vehicle or its pick-up coil, and the signal may comprise data representative of the type or characteristics of the device to be charged (the electric vehicle or the battery) or the pick-up coil. Receiver 808 is able to compute a desired inductance for the base induction coil based on the received signal, for example an inductance to optimise charging with the pick-up coil, and send a corresponding signal to the switching device to connect the wires of the base induction coil to give the coil an inductance the same or similar to the desired inductance.

The signal comprising detail about the device to be charged may be sent by any appropriate means of communication, including Bluetooth®, ZigBee®, cellular, etc.

In some embodiments of the invention, the switching device 805 and receiver 808 are housed within the same physical housing as the induction coils 801 and 802. In other embodiments, the switching device 805 and receiver 808 are remote from, but electrically connected to the housing containing the induction coils 801 and 802.

More generally, the induction coil may comprise any means operable to alter the configuration of the induction coil in response to a signal received from another coil or device indicative of characteristics of the coil or device to be charged or from which to charge. The induction coil may also comprise means to select a configuration of the induction coil based on the received signal. For example, if a signal from a pick-up coil indicates that optimum charging of the pick-up coil requires a base coil to have a certain inductance, the induction coil may include a processor or other suitable device able to select the appropriate configuration of the induction coil, for example the configuration giving it the closest inductance to the desired inductance for optimum charging.

Figure 9:
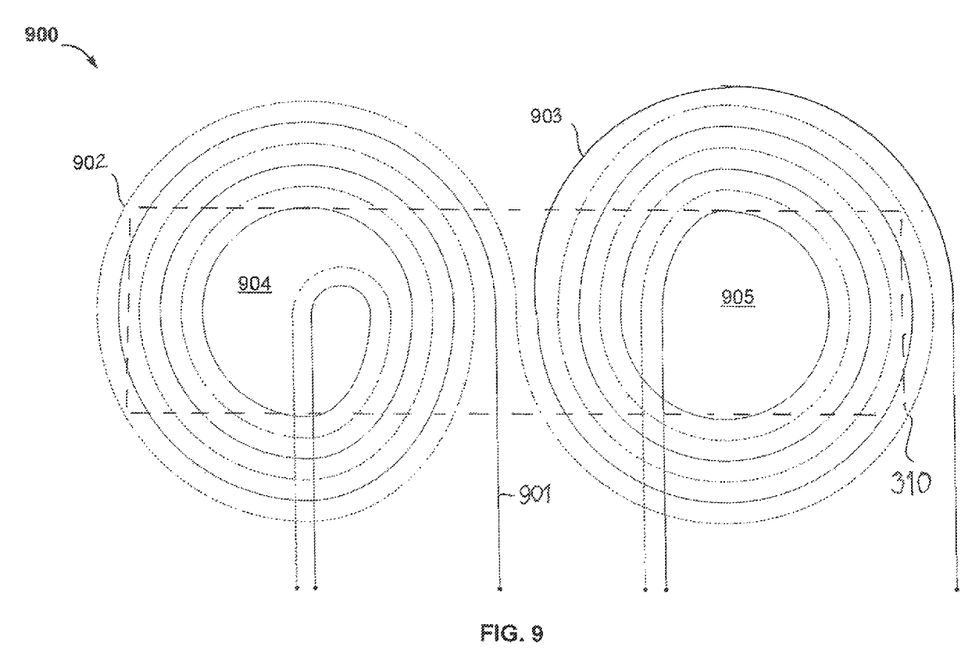
FIG. 9 is a diagram of a winding arrangement of three lengths of conducting material according to another embodiment of the invention.

FIG. 9 is a diagram of a winding arrangement 900 of three lengths of conducting material according to another embodiment of the invention. Winding arrangement 900 comprises three litz wires 901, 902 and 903 in an induction coil formed from two substantially co-planar coils 904 and 905. Wires 901 and 903 are shown as solid lines and wire 902 as a dotted line in FIG. 9 solely for purposes of clarity. Wire 901 is wound in a parallel arrangement with one part of wire 902 to form coil 904. Wire 903 is wound in a parallel arrangement with another part of wire 902 to form coil 905. As a result, both coils comprise one length of wire, i.e. wire 902, common to both coils.

Winding arrangement 900 of FIG. 9 may be useful as an induction coil in a number of situations, depending on how the wires are connected. If wires 901 and 903 are connected in series, for example, a winding arrangement similar to winding arrangement 600 of FIG. 6 is created. In an alternative embodiment, wires 901 and 903 are connected in anti-phase and the coils of wires 901 and 903 are tuned separately from the coil of wire 902 and combined after a rectifier. Such an embodiment may enable winding arrangement 900, when used as a pick-up coil in an electric vehicle induction coil, to pick-up an additional spatial dimension of the flux vector compared to the winding arrangements described above.

Suitable connection means may be provided to connect the terminals of each wire 901, 902, and 903 together in the desired manner.

The embodiments shown in FIGS. 3 to 9 have generally been discussed by way of example in relation to their use in a base induction coil in a wireless energy transfer system. It will also be understood that these embodiments of the invention can also be used in pick-up or electric vehicle induction coils where the advantages discussed are appropriate and useful to their use in this way.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be a processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Unless the context clearly requires otherwise, throughout the description and claims, the terms "including", "comprising" and the like are to be construed in an inclusive sense, as opposed to an exclusive or exhaustive sense. That is to say, in the sense of "including, but not limited to."

Any discussion of the prior art throughout the specification should in no way be considered as an admission that such prior art is widely known or forms part of the common general knowledge in the field.

What is claimed is:

1. An apparatus for transmitting or receiving wireless power, the apparatus comprising:
    a plurality of substantially co-planar coils; and
    wherein the plurality of coils comprise one or more lengths of conducting material, each length of conducting material being electrically connectable at each end to a power source or battery;
    wherein the plurality of coils are wound such that electric current in the lengths of conducting material flows in the same direction in adjacent portions of adjacent coils, and
    wherein two or more of the coils comprise the same at least one of the lengths of conducting material.

2. The apparatus as claimed in claim 1, wherein each coil comprises a spiral winding of each of the lengths of conducting material.

3. The apparatus as claimed in claim 1, wherein each length of conducting material is continuously wound to comprise all of the coils.

4. The apparatus as claimed in claim 3, wherein each length of conducting material comprises:
    a first end forming an innermost winding of one of the coils; and
    a second end forming an innermost winding of another of the coils.

5. The apparatus as claimed in claim 3, wherein each length of conducting material comprises:
    a first end forming an innermost winding of one of the coils; and
    a second end forming an outermost winding of another of the coils.

6. The apparatus as claimed in claim 3, wherein each length of conducting material comprises:
    a first end forming an outermost winding of one of the coils; and
    a second end forming an outermost winding of another of the coils.

7. The apparatus as claimed in claim 1, wherein the plurality of coils comprise two or more lengths of conducting material.

8. The apparatus as claimed in claim 7, wherein the two or more lengths of conducting material are arranged in parallel alignment.

9. The apparatus as claimed in claim 7, wherein the apparatus further comprises a switching device operable to connect any number of the two or more lengths of conducting material in parallel to the power source or battery.

10. The apparatus as claimed in claim 9, wherein the apparatus further comprises a receiver in communication with the switching device, wherein the receiver is operable to receive a signal and cause the switching device to operate based on the received signal.

11. The apparatus as claimed in claim 7, wherein the apparatus further comprises a switching device operable to connect any number of the two or more lengths of conducting material together in series.

12. The apparatus as claimed in claim 1, wherein the apparatus further comprises one or more magnetically permeable members magnetically associated with the plurality of coils.

13. The apparatus as claimed in claim 1, wherein one or more of the lengths of conducting material comprise litz wire.

14. A method of forming an apparatus for transmitting or receiving wireless power, the method comprising:
    winding one or more lengths of conducting material in a continuous path to form a plurality of substantially co-planar coils with two or more of the coils comprising the same at least one of the lengths of conducting material.

15. The method as claimed in claim 14, wherein the method comprises:
    winding a first coil from the innermost winding to the outermost winding; and winding a second coil from the outermost winding to the innermost winding.

16. The method as claimed in claim 14, wherein the method comprises:
   winding a first coil from the innermost winding to the outermost winding; and
   winding a second coil from the innermost winding to the outermost winding.

17. The method as claimed in claim 14, wherein the method comprises:
   winding a first coil from the outermost winding to the innermost winding; and
   winding a second coil from the innermost winding to the outermost winding.

18. The method as claimed in claim 14, further comprising providing one or more magnetically permeable members in magnetic association with the coils.

19. A method of operating a first induction coil in a wireless power transfer system, the method comprising:
   receiving a signal from a second induction coil with which the first induction coil is to transfer power, the signal comprising characteristics of the second induction coil or a device to which the second induction coil is attached;
   selecting a configuration of the first induction coil based on the characteristics of the second induction coil and a desired power transfer between the first and second induction coils; and
   altering the configuration of the first induction coil based on the selected configuration.

20. The method as claimed in claim 19, wherein the step of altering the configuration of the first induction coil comprises connecting two or more lengths of conducting material in the first induction coil in parallel and/or in series with each other, a power source, and/or a battery.

* * * * *